(12) United States Patent  
Tandy et al.

(10) Patent No.: US 11,905,410 B2
(45) Date of Patent: Feb. 20, 2024

(54) THREE-DIMENSIONAL PRINTING

(71) Applicant: Hewlett-Packard Development Company, L.P., Spring, TX (US)

(72) Inventors: Jesiska Tandy, San Diego, CA (US); Stanely J. Kozmiski, San Diego, CA (US); Alay Yemane, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 266 days.

(21) Appl. No.: 17/298,909

(22) PCT Filed: Jun. 10, 2019

(86) PCT No.: PCT/US2019/036284
§ 371 (c)(1),
(2) Date: Jun. 1, 2021

(87) PCT Pub. No.: WO2020/251525
PCT Pub. Date: Dec. 17, 2020

(65) Prior Publication Data
US 2022/0112357 A1 Apr. 14, 2022

(51) Int. Cl.
*B33Y 10/00* (2015.01)
*B33Y 70/00* (2020.01)
(Continued)

(52) U.S. Cl.
CPC .............. *C08L 77/02* (2013.01); *B22F 1/10* (2022.01); *B29C 64/165* (2017.08); *B33Y 10/00* (2014.12);
(Continued)

(58) Field of Classification Search
CPC ........ B29C 64/165; B33Y 10/00; B33Y 70/00
See application file for complete search history.

(56) References Cited

U.S. PATENT DOCUMENTS 7,927,710 B2    4/2011   Hewel
9,862,140 B2    1/2018   Lewicki et al.

FOREIGN PATENT DOCUMENTS

CN        106633714        5/2017
WO     WO-2017180166 A1   10/2017
(Continued)

OTHER PUBLICATIONS

State-Of-The-Art of Fiber-Reinforced Polymers in Additive Manufacturing Technologies, Journal of Reinforced Plastics & Composites, May 3, 2019, 24 pages.

*Primary Examiner* — Mary Lynn F Theisen
(74) *Attorney, Agent, or Firm* — HP Inc. Patent Department

(57) ABSTRACT

A three-dimensional printing formulation can include polymeric powder. The polymeric powder can include high aspect ratio composite particles including glass fibers coated with an encapsulating polymer in an amount from about 5 wt % to about 80 wt % based on a total weight of the polymeric powder, and low aspect ratio filler particles in an amount from about 20 wt % to about 95 wt % based on a total weight of the polymeric powder. The high aspect ratio composite particles can have an aspect ratio from about 7:1 to about 30:1 and the low aspect ratio filler particles can have an aspect ratio from 1:1 to less than 7:1.

15 Claims, 6 Drawing Sheets

(51) Int. Cl.
  *B29C 64/165* (2017.01)
  *C08L 77/02* (2006.01)
  *C08K 7/14* (2006.01)
  *B22F 1/10* (2022.01)
  *B29K 509/08* (2006.01)
(52) U.S. Cl.
  CPC ................ *B33Y 70/00* (2014.12); *C08K 7/14* (2013.01); *B29K 2509/08* (2013.01)

(56) References Cited

FOREIGN PATENT DOCUMENTS

| | | | |
|---|---|---|---|
| WO | WO-2018106237 A1 * | 6/2018 | ........... B29C 64/153 |
| WO | WO-2019069032 | 4/2019 | |
| WO | WO-2019108273 A1 | 6/2019 | |

* cited by examiner

THREE-DIMENSIONAL PRINTING

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefitted from the ability to rapidly prototype and customize parts for customers.

DETAILED DESCRIPTION

Figure 1:
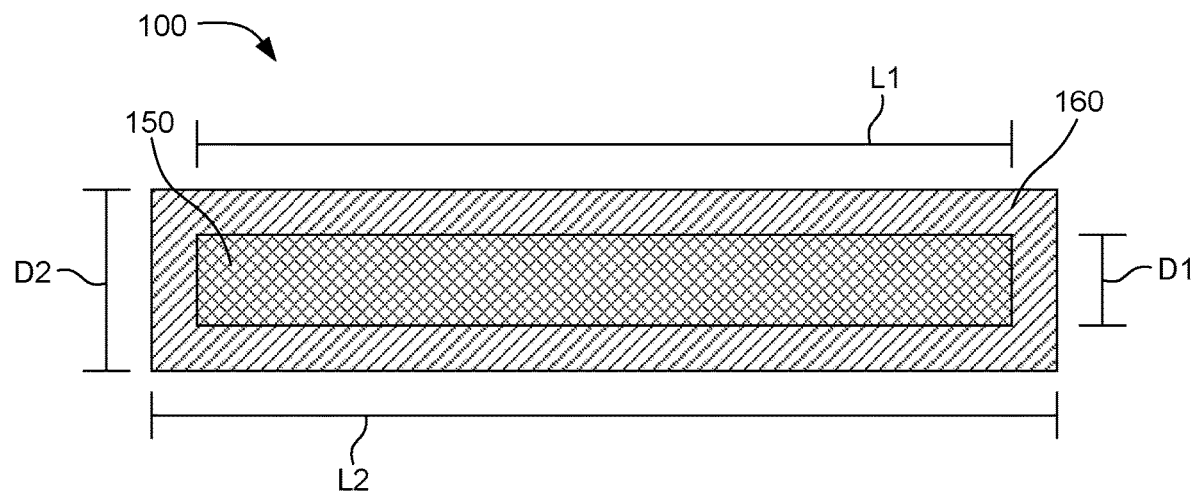
FIG. 1 is a cross sectional view of an example polymeric powder particle in accordance with the present disclosure.

The present disclosure describes three-dimensional (3D) printing formulations, materials kits for 3D printing, and methods of making 3D printed articles. In one example, a 3D printing formulation can include a polymeric powder, including high aspect ratio composite particles including glass fibers coated with an encapsulating polymer in an amount from about 5 wt % to about 80 wt % based on a total weight of the polymeric powder and low aspect ratio filler particles in an amount from about 20 wt % to about 95 wt % based on a total weight of the polymeric powder. The high aspect ratio composite particles can have an aspect ratio from 7:1 to about 30:1 and the low aspect ratio filler particles can have an aspect ratio from 1:1 to less than 7:1. In some examples, the high aspect ratio composite particles include from about 10 wt % to about 30 wt % glass fibers coated with from about 70 wt % to about 90 wt % encapsulating polymer, based on a total weight of the high aspect ratio composite particles. In some examples, the low aspect ratio filler particles have a D50 particle size distribution, by volume, from about 5 μm to about 100 μm. In some additional examples, the low aspect ratio filler particles are polymer particles, core-shell polymer particles, polymer-coated particles, polymer-coated fibers, or a combination thereof. In still additional examples, the low aspect ratio filler particles are polyamide-11 polymer particles, polyamide-12 polymer particles, glass fibers, glass fibers coated with polyamide-11 polymer, glass fibers coated with polyamide-12 polymer, inorganic filler particles, glass beads, glass beads coated with polyamide-11 polymer, glass beads coated with polyamide-12 polymer, or a combination thereof. In further examples, the low aspect ratio filler particles are glass fibers coated with polyamide-11 polymer or polyamide-12 polymer, the low aspect ratio filler particles having an average aspect ratio from about 1.3:1 to about 6:1 and a D50 particle size distribution, by volume, from about 70 μm to about 100 μm. In still further examples, the low aspect ratio filler particles include polyamide-11 polymer particles, polyamide-12 polymer particles, or glass beads coated with polyamide-11 polymer or polyamide-12 polymer, the low aspect ratio filler particles having an average aspect ratio of 1:1 to about 1.3:1 and a D50 particle size distribution, by volume, from about 5 μm to about 70 μm. In additional examples, the polymeric powder has a bulk density from about 0.18 g/cc to about 0.6 g/cc.

In another example, a materials kit for 3D printing can include a polymeric powder including high aspect ratio composite particles and low aspect ratio filler particles, the high aspect ratio composite particles including glass fibers coated with an encapsulating polymer in an amount from about 5 wt % to about 80 wt % based on a total weight of the polymeric powder and having an aspect ratio from about 7:1 to about 30:1, the low aspect ratio filler particles in an amount from about 20 wt % to about 95 wt % based on a total weight of the polymeric powder and having an aspect ratio from 1:1 to less than 7:1. The materials kit for 3D printing can further include a fusing agent including an energy absorber to absorb electromagnetic radiation to produce heat. In some examples, the encapsulating polymer includes polyamide-12, polyamide-11, polyamide-6-13, polyamide-6, polypropylene, thermoplastic polyamide, thermoplastic polyurethane, or a combination thereof. In some additional examples, the energy absorber can include a carbon black pigment, a near-infrared absorbing dye, a near-infrared absorbing pigment, a tungsten bronze, a molybdenum bronze, metal nanoparticles, or a conjugated polymer, or a combination thereof.

In another example, a method of making a 3D printed article can include iteratively applying individual build material layers of a polymeric powder, based on a 3D object model, selectively jetting a fusible fluid onto individual build material layers, where the fusible fluid comprises an energy absorber, and exposing the polymeric powder to electromagnetic energy to selectively fuse the high aspect ratio composite particles and low aspect ratio filler particles in contact with the energy absorber at individual build material layers to form a 3D printed article. The polymeric powder can include high aspect ratio composite particles and low aspect ratio filler particles, the high aspect ratio composite particles including glass fibers coated with an encapsulating polymer in an amount from about 5 wt % to about 80 wt % based on a total weight of the polymeric powder and having an aspect ratio from about 7:1 to about 30:1, the low aspect ratio filler particles included in an amount from about 20 wt % to about 95 wt % based on a total weight of the polymeric powder and having an aspect ratio from 1:1 to less than 7:1. In some examples, the method can further include maintaining the 3D printed article at a temperature from about 140° C. to about 180° C. for a period from about 30 minutes to about 72 hours after formation of the 3D printed article. In other examples, the method can further include allowing the 3D printed article to cool immediately following formation of the 3D printed article. In some examples, the printed article has a tensile strength in the X-Y axis from about 25 MPa to about 65 MPa, a Young's modulus in the X-Y axis from about 1600 MPa to about 4500 MPa, and a strain at break in the X-Y axis from about 4% to about 50%.

In addition to the examples described above, the 3D printing formulations, the materials kits, and the methods of manufacturing will be described in greater detail below. It is also noted that when discussing the 3D printing formulations, the materials kits, and methods of manufacturing described herein, these relative discussions can be considered applicable to the other examples, whether or not they are explicitly discussed in the context of that example. Thus, for example, in discussing a high aspect ratio composite particle related to a 3D printing formulation, such disclosure is also relevant to and directly supported in the context of the methods of manufacturing and the materials kits described herein, and vice versa.

3D Printing Formulations

In further detail, the present disclosure describes various printing formulations including a polymeric powder or a polymeric powder blend. The polymeric powder can include both high aspect ratio composite particles and low aspect ratio filler particles.

The high aspect ratio composite particles can include polymer encapsulated glass fibers. These high aspect ratio composite particles can provide reinforcement to 3D printed articles to achieve good ultimate tensile strength, Young's modulus, strain at break (%), etc. However, where the ratio of high aspect ratio composite particles to low aspect ratio filler particles in the polymeric powder becomes too high, the bulk density of the polymeric powder can become too low to produce 3D printed articles with good density and integrity. Conversely, where the ratio of high aspect ratio composite particles to low aspect ratio filler particles in the polymeric powder becomes too low, the potential benefits of adding the high aspect ratio composite particles becomes negligible. As such, the high aspect ratio composite particles can generally be present in the polymeric powder in an amount of from about 5 wt % to about 80 wt % based on a total weight of the polymeric powder. In other examples, the high aspect ratio composite particles can be present in the polymeric powder in an amount of from about 50 wt % to about 75 wt % based on a total weight of the polymeric powder. In some specific examples, the high aspect ratio composite particles can be present in the polymeric powder in an amount of from about 5 wt % to about 25 wt %, from about 15 wt % to about 35 wt %, from about 25 wt % to about 45 wt %, from about 35 wt % to about 55 wt %, from about 45 wt % to about 65 wt %, or from about 55 wt % to about 75 wt % based on a total weight of the polymeric powder.

The high aspect ratio composite particles can generally have an aspect ratio of from about 7:1 to about 30:1 length to diameter. High aspect ratio composite particles can further be defined based "average" aspect ratio. Thus, individual aspect ratios of the high aspect ratio composite particles used in the polymeric powder can be summed and divided by the number of high aspect ratio composite particles in the polymeric powder to arrive at the average aspect ratio of high aspect ratio composite particles employed in the polymeric powder. In some specific examples, the high aspect ratio composite particles can have an average aspect ratio of from about 3:1 to about 10:1, from about 5:1 to about 15:1, from about 10:1 to about 20:1, from about 15:1 to about 25:1, or from about 20:1 to about 30:1.

The high aspect ratio composite particles can generally include from about 10 wt % to about 30 wt % glass fibers coated with from about 70 wt % to about 90 wt % encapsulating polymer, based on a total weight of the high aspect ratio composite particles. In some specific examples, the high aspect ratio composite particles can include from about 10 wt % to about 20 wt % glass fibers coated with from about 80 wt % to about 90 wt % encapsulating polymer, based on a total weight of the high aspect ratio composite particles. In some additional examples, the high aspect ratio composite particles can include from about 20 wt % to about 30 wt % glass fibers coated with from about 70 wt % to about 80 wt % encapsulating polymer, based on a total weight of the high aspect ratio composite particles.

One example of a high aspect ratio composite particle 100 is illustrated in FIG. 1. The composite particle can include a glass fiber 150 encapsulated with an encapsulating material 160. The glass fiber can have a diameter D1 and a length L1. The composite particle can have a diameter D2 and a length L2.

Low aspect ratio filler particles can be used to increase the bulk density of polymeric powder or polymeric powder blend. The low aspect ratio composite particles can generally have an aspect ratio of from 1:1 to less than 7:1 length to diameter. Low aspect ratio composite particles can further be defined based on an "average" aspect ratio. Thus, individual aspect ratios of the low aspect ratio composite particles used in the polymeric powder can be summed and divided by the number of low aspect ratio composite particles in the polymeric powder to arrive at the average aspect ratio of low aspect ratio composite particles present in the polymeric powder. In some specific examples, the low aspect ratio composite particles can have an average aspect ratio of from about 1.3:1 to about 6:1, from about 2:1 to about 6.5:1, or from about 1.3:1 to about 4:1, for example.

A variety of low aspect ratio filler particles can be employed, depending on the desired properties of the 3D printed part. Generally, the low aspect ratio filler particles can have a D50 particle size distribution, by volume, from about 5 μm to about 100 μm. However, the specific particle size distribution of the low aspect ratio filler particles can depend on the particular high aspect ratio composite particles employed. Thus, in some examples, the D50 particle size distribution, by volume, of the low aspect ratio filler particles can be from about 5 μm to about 50 μm, from about 25 μm to about 75 μm, or from about 50 μm to about 100 μm. Particle size distribution can be measured by laser diffraction, microscope imaging, or other suitable methodology. In some specific examples, the particle size distribution can be measured using a Malvern™ Mastersizer™, for example. This tool considers everything a sphere, so the rod-shaped high aspect ratio composite particles are reported based on their equivalent spherical volume, where the long dimension of the rod generally equals the diameter of the sphere.

The low aspect ratio filler particles can generally be present in the polymeric powder in an amount of from about 20 wt % to about 95 wt % based on a total weight of the polymeric powder. In other examples, the low aspect ratio filler particles can be present in the polymeric powder in an amount of from about 25 wt % to about 50 wt % based on a total weight of the polymeric powder. In some specific examples, the high aspect ratio composite particles can be present in the polymeric powder in an amount of from about 25 wt % to about 45 wt %, 35 wt % to about 55 wt %, 45 wt % to about 65 wt %, 55 wt % to about 75 wt %, 65 wt % to about 85 wt %, or from about 75 wt % to about 95 wt % based on a total weight of the polymeric powder.

The type of low aspect ratio filler particle employed in the polymeric powder is not particularly limited, so long as it can provide the polymeric powder with a suitable bulk density for 3D printing and it can be reasonably printed together with the high aspect ratio composite particles to produce a 3D printed article having good density and integrity. In some examples, the low aspect ratio filler particles can be or include polymer particles, core-shell polymer particles, polymer-coated particles, polymer-coated fibers, inorganic fillers, the like, or a combination thereof. For example, in some cases, the low aspect ratio filler particles can be or include polymer particles (e.g., polyamide-12, polyamide-11, polyamide-6-13, polyamide-6, polypropylene, suitable elastomers (e.g., thermoplastic polyamide, thermoplastic polyurethane, etc.), glass fibers, glass fibers coated with an encapsulating polymer, inorganic fillers, (e.g., glass beads, hollow glass, crushed glass, talc, mica, the like, or a combination thereof), glass beads or other inorganic fillers coated with an encapsulating polymer, the like, or a combination thereof. In some specific examples, the low aspect ratio filler particles can be or include glass fibers coated with an encapsulating polymer (e.g., polyamide-11 polymer or polyamide-12 polymer, for example) having an average aspect ratio from about 1.3:1 to about 6:1 and a D50 particle size distribution, by volume, from about 70 µm to about 100 µm. In other specific examples, the low aspect ratio filler particles can be or include polyamide-11 polymer particles, polyamide-12 polymer particles, or glass beads coated with polyamide-11 polymer or polyamide-12 polymer. Where this is the case, the low aspect ratio filler particles can generally have an average aspect ratio of 1:1 to about 1.3:1 and a D50 particle size distribution, by volume, from about 5 µm to about 70 µm.

As described previously, the low aspect ratio filler particles can be added to provide the polymeric powder with a suitable bulk density for 3D printing. With this in mind, the polymeric powder can generally have a bulk density of from about 0.18 grams per cubic centimeter (g/cc) to about 0.6 g/cc. In some specific examples, the polymeric powder can have a bulk density of from about 0.18 g/cc to about 0.3 g/cc, from about 0.2 g/cc to about 0.4 g/cc, from about 0.3 g/cc to about 0.5 g/cc, or from about 0.4 g/cc to about 0.6 g/cc.

As described above, the polymeric powder can include both high aspect ratio composite particles and low aspect ratio composite particles, each of which can include encapsulating polymers, depending on the particular example. Suitable encapsulating polymers can typically be a polycrystalline polymeric material having a well-defined melting temperature and a well-defined recrystallization temperature. In some further examples, the encapsulating polymer can have a melting temperature of from about 100° C. to about 250° C. In some more specific examples, the encapsulating polymer can have a melting temperature of from about 100° C. to about 150° C., from about 125° C. to about 175° C., from about 150° C. to about 200° C., from about 175° C. to about 225° C., or from about 200° C. to about 250° C. In some non-limiting examples, the recrystallization temperature of the encapsulating polymer can be from about 5° C. to about 60° C., or from about 10° C. to about 50° C., lower than the melting temperature of the encapsulating polymer. Some non-limiting examples of encapsulating polymeric materials can include polyamide-12, polyamide-11, polyamide-6-13, polyamide-6, polypropylene, suitable elastomers (e.g., thermoplastic polyamide, thermoplastic polyurethane, etc.), the like, or a combination thereof. In some examples, the encapsulating polymer can be or include a polyamide. In some specific examples, the encapsulating polymer can be or include polyamide-12, polyamide-11, or a combination thereof. The encapsulating polymer can partially or fully encapsulate the substrate (e.g., glass fiber, inorganic filler particle, etc.), depending on the example.

Figure 2:
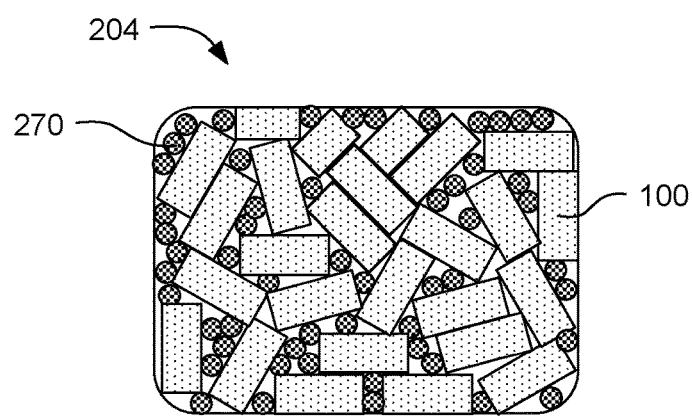
FIG. 2 is a schematic view of an example polymeric powder blend for 3D printing in accordance with the present disclosure.

FIG. 2 shows an example of a polymeric powder 204 for 3D printing. The powder bed material can include high aspect ratio composite particles 100 and low aspect ratio filler particles 270. The low aspect ratio filler particles can increase the bulk density of the polymeric powder, for example.

Materials Kits for 3D Printing

Figure 3:
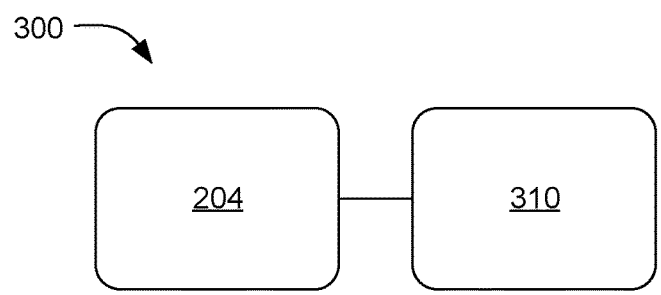
FIG. 3 is a schematic view of an example materials kit for 3D printing in accordance with the present disclosure.

The present disclosure also extends to materials kits for 3D printing that can include the polymeric powder described herein and a fusible agent including an energy absorber to absorb electromagnetic radiation to produce heat. FIG. 3 shows an example materials kit 300 for 3D printing that includes a polymeric powder 204 and a fusible agent 310. In some examples, the fusible agent can include water and an energy absorber. These materials can be used in 3D printing methods and systems as described below to form 3D printed articles. In particular, the fusing agent can be selectively applied to the polymeric powder and layers of the polymeric powder can be fused to form a 3D printed article.

In some examples, the materials kit for 3D printing can include polymeric powder and a fusible agent packaged together. In certain examples, the polymeric powder can be in the form of a container or bag of loose powder material. In other examples, the polymeric powder can be in a cartridge designed to fit in a specific 3D printing system. Similarly, the fusible agent can be in a cartridge designed for use with a specific 3D printing system, or the fusing agent can be in another package, such as a bottle.

Depending on the particular polymeric powder employed, the polymeric powder can be capable of being formed into 3D printed parts with a variety of resolutions. As used herein, "resolution" refers to the size of the smallest feature that can be formed on a 3D printed part. The polymeric powder can form layers from about 20 µm to about 100 µm thick, allowing the fused layers of the printed part to have roughly the same thickness. This can provide a resolution in the z-axis (i.e., depth) direction of about 20 µm to about 100 µm.

Fusing Agents

In further examples, the fusible agent can be a fluid including an energy absorber that is capable of absorbing electromagnetic radiation to produce heat. The energy absorber can be colored or colorless. In various examples, the energy absorber can be glass fiber, titanium dioxide, clay, mica, talc, barium sulfate, calcium carbonate, a near-infrared absorbing dye, a near-infrared absorbing pigment, a dispersant, a conjugated polymer, or combinations thereof. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly (styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the energy absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the energy absorbing pigments described above. In some examples, the dispersant itself can also absorb radiation. Non-limiting examples of dispersants that can be included as an energy absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof.

The amount of energy absorber in the fusible agent can vary depending on the type of energy absorber. In some examples, the concentration of energy absorber in the fusible agent can be from about 0.1 wt % to about 20 wt %. In one example, the concentration of energy absorber in the fusible agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the energy absorber can have a concentration in the fusible agent such that after the fusible agent is printed onto the polymeric powder, the amount of energy absorber in the polymeric powder can be from about 0.0003 wt % to about 10 wt %, or from about 0.005 wt % to about 5 wt %, with respect to the weight of the polymeric powder.

Methods of Making 3D Printed Articles

Figure 4:
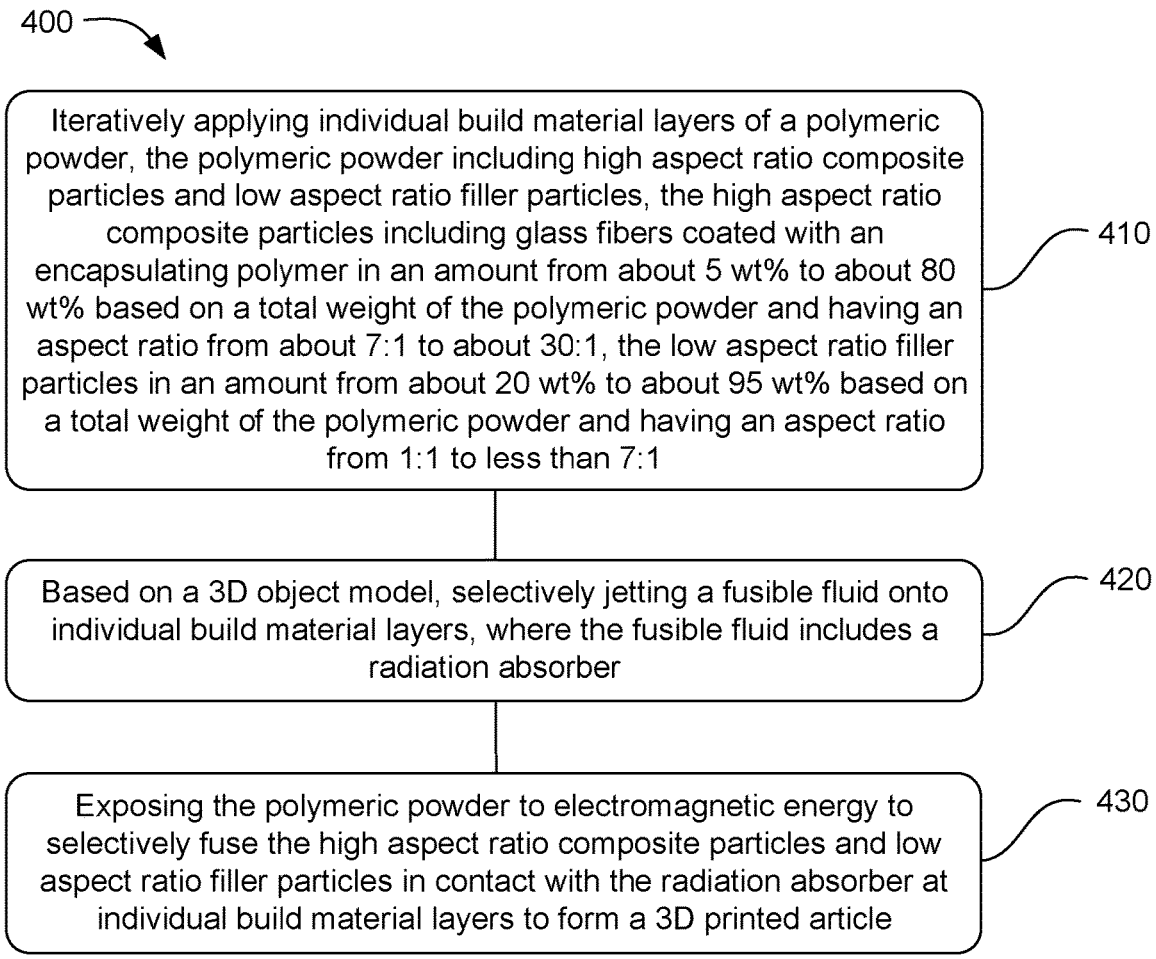
FIG. 4 is a flowchart illustrating an example method of making a 3D printed article in accordance with the present disclosure.

In various examples, the 3D printed articles described herein can be formed from a polymeric powder using a process that involves jetting a fusible agent onto layers of the polymeric powder and then fusing the polymeric powder using electromagnetic energy. FIG. 4 is a flowchart illustrating one example method 400 of making a 3D printed article. The method includes iteratively applying 410 individual build material layers of a polymeric powder, the polymeric powder including high aspect ratio composite particles and low aspect ratio filler particles, the high aspect ratio composite particles including glass fibers coated with an encapsulating polymer in an amount from about 5 wt % to about 80 wt % based on a total weight of the polymeric powder and having an average aspect ratio from about 7:1 to about 30:1, the low aspect ratio filler particles in an amount from about 20 wt % to about 95 wt % based on a total weight of the polymeric powder and having an average aspect ratio from 1:1 to less than 7:1. In further detail, based on a 3D object model, the method further includes selectively jetting 420 a fusible fluid onto individual build material layers, where the fusible fluid comprises an energy absorber; and exposing 430 the polymeric powder to electromagnetic energy to selectively fuse the high aspect ratio composite particles and low aspect ratio filler particles in contact with the energy absorber at individual build material layers to form a 3D printed article.

As mentioned above, the 3D printed article can be formed by jetting a fusible agent onto individual build material layers of a polymeric powder according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of the area where the fusible agent is to be printed. Other information may also be included, such as structures to be formed of additional different materials or color data for printing the article with various colors at different locations on the article. The 3D object model may also include features or materials specifically related to jetting agents on individual build material layers of a polymeric powder, such as the desired amount of agent to be applied to a given area. This information may be in the form of a droplet saturation, for example, which can instruct a 3D printing system to jet a certain number of droplets of agent into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymeric powder can be spread on a bed to form a powder bed. At the beginning of the process, the powder bed can be empty because no polymeric powder particles have been spread at that point. For the first layer, the polymeric powder particles can be spread onto an empty build platform. The build platform can be a flat surface made of a material sufficient to withstand the heating conditions of the 3D printing process, such as a metal. Thus, applying individual build material layers of a polymeric powder to a powder bed support includes spreading polymeric powder particles onto the empty build platform for the first layer. In other examples, a number of initial layers of polymeric powder or the like can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusible agent including an energy absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The energy absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymeric powder can be spread over the powder bed and the process can be repeated to form additional layers until a complete 3D article is printed. Thus, applying individual build material layers of a polymeric powder to a powder bed support can also include spreading layers of polymeric powder particles over the loose particles and fused layers beneath the new layer of polymeric powder particles.

In some examples, the 3D printed article can be cured or annealed after printing. This can be accomplished in a number of ways. In some examples, the 3D printed article can be transferred to a curing or annealing oven after formation and maintained at a curing or annealing temperature for a designated period of time, depending on the specific polymeric powder employed, the dimensions of the 3D printed article, etc. In other examples, the 3D printing system itself can be used to cure or anneal the 3D printed article. For example, the 3D printed article can be cured or annealed in a heated print bed or chamber of a 3D printing system. In some examples, the annealing process can be performed at a temperature of from about 140° C. to about 180° C. However, this can depend on the polymeric powder being employed. For example, it is noted that the annealing temperature can generally be lower than a melting temperature of the 3D printed part being employed. For example, fresh polyamide-12 powder can have a melting temperature of about 187° C. However, after forming a 3D printed article with the polyamide-12, the 3D printed article can have a lower melting temperature of about 177° C. Thus, the annealing temperature can be lower than the melting temperature of the 3D printed article, rather than the polymeric powder. In some examples, the annealing temperature can be from about 140° C. to about 160° C., from about 150° C. to about 170° C., from about 160° C. to about 175° C., or from about 170° C. to about 180° C. Where annealing is employed, the 3D printed article can generally be maintained at the annealing temperature for a period of from about 30 minutes to about 72 hours after formation of the 3D printed article. In some specific examples, the 3D printed article can be maintained at the annealing temperature for a period of from about 30 minutes to about 4 hours, from about 2 hours to about 10 hours, from about 8 hours to about 20 hours, from about 10 hours to about 30 hours, from about 20 hours to about 40 hours, from about 30 hours to about 50 hours, from about 40 hours to about 60 hours, or from about 50 hours to about 72 hours after formation of the 3D printed article. In other examples, the polymeric powder can be pre-aged at an elevated temperature below the melting temperature of the polymeric powder prior to forming the 3D printed part. In some examples, this process can be performed within the same temperature ranges described for the annealing process and for the same periods of time as the annealing process. However, the pre-aging process can be performed with the polymeric powder prior to forming the 3D printed article.

In other examples, no curing or annealing process may be desirable. In such examples, the 3D printed article can be allowed to cool immediately following formation of the 3D printed article. Generally, this can be performed using a natural cooling process by allowing the 3D printed article to equilibrate to room temperature under ambient conditions. In other examples, an accelerated cooling process can be employed, such as via convective cooling, heat transfer fluids, refrigeration systems, the like, or a combination thereof.

It is further noted that the 3D printed articles employing the polymeric powder described herein and printed using the methods described herein can have a variety of material properties. For example, the 3D printed article can have a tensile strength in the X-Y axis of from about 25 megapascals (MPa) to about 65 MPa. In other examples, the 3D printed article can have a tensile strength in the X-Y axis of from about 25 MPa to about 45 MPa, from about 35 MPa to about 55 MPa, from about 45 MPa to about 65 MPa, from about 46 MPa to about 65 MPa, from about 50 MPa to about 65 MPa, or from about 55 MPa to about 65 MPa.

In additional examples, 3D printed articles employing the polymeric powder described herein and printed using the methods described herein can have a Young's modulus in the X-Y axis of from about 1600 MPa to about 4500 MPa. In some other examples, the 3D printed article can have a Young's modulus in the X-Y axis of from about 1600 MPa to about 2500 MPa, from about 2000 MPa to about 3000 MPa, from about 2500 MPa to about 3500 MPa, from about 3000 MPa to about 4000 MPa, from about 3500 MPa to about 4500 MPa, from about 3600 MPa to about 4500 MPa, or from about 4000 MPa to about 4500 MPa.

In still additional examples, 3D printed articles employing the polymeric powder described herein and printed using the methods described herein can have a strain at break (%) in the X-Y axis of from about 4% to about 50%. In some other examples, the 3D printed articles can have a strain at break (%) in the X-Y axis of from about 4% to about 15%, from about 10% to about 30%, from about 20% to about 40%, from about 30% to about 50%, or from about 40% to about 50%.

Figure 5:
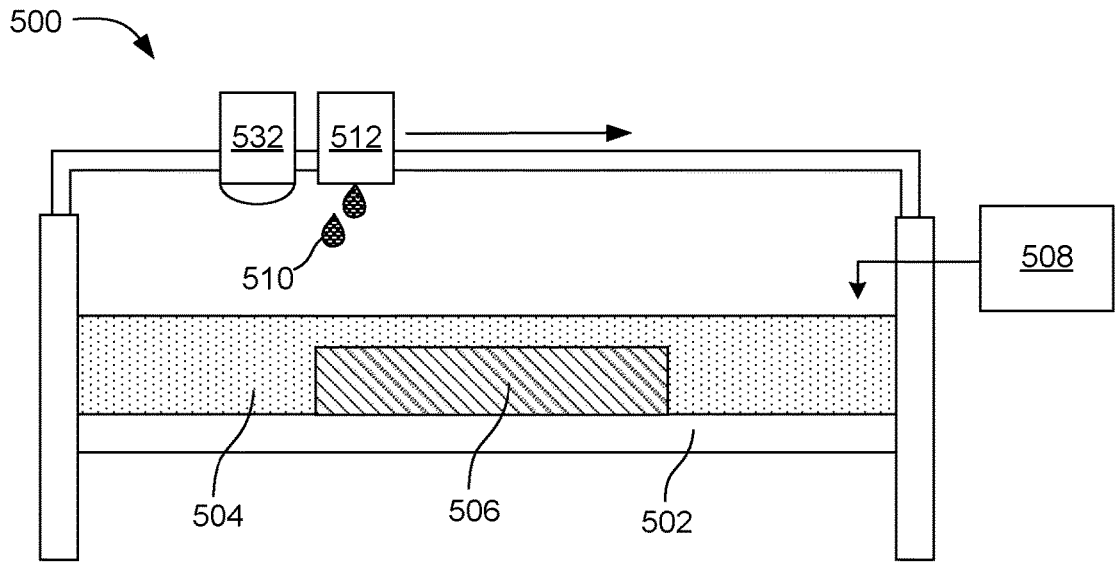
FIG. 5 is a schematic view of an example 3D printing system in accordance with the present disclosure.
Figure 6:
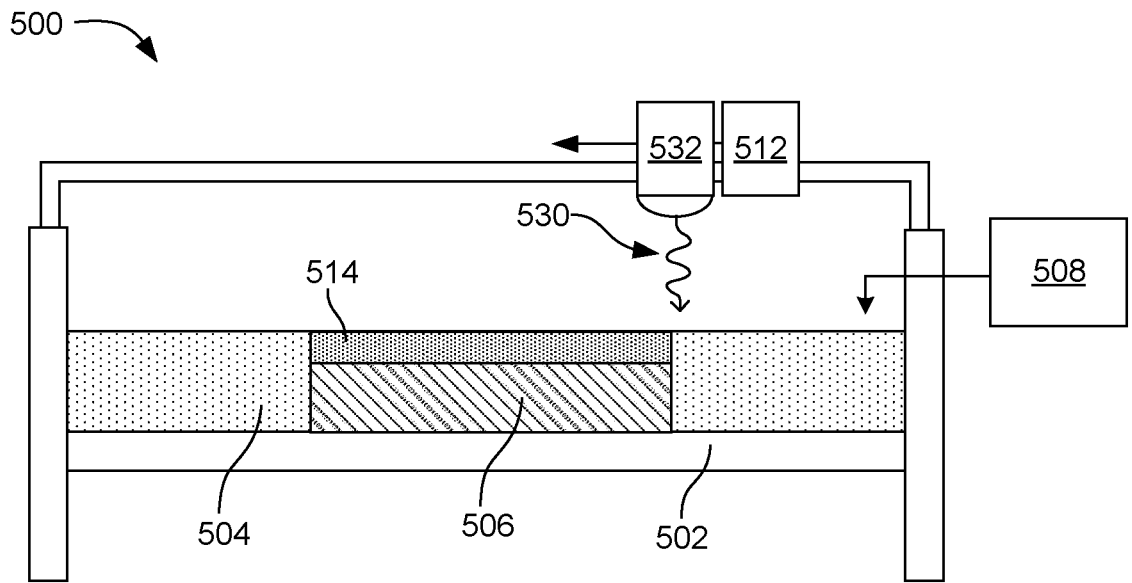
FIG. 6 is another schematic view of the example 3D printing system in accordance with the present disclosure.
Figure 7:
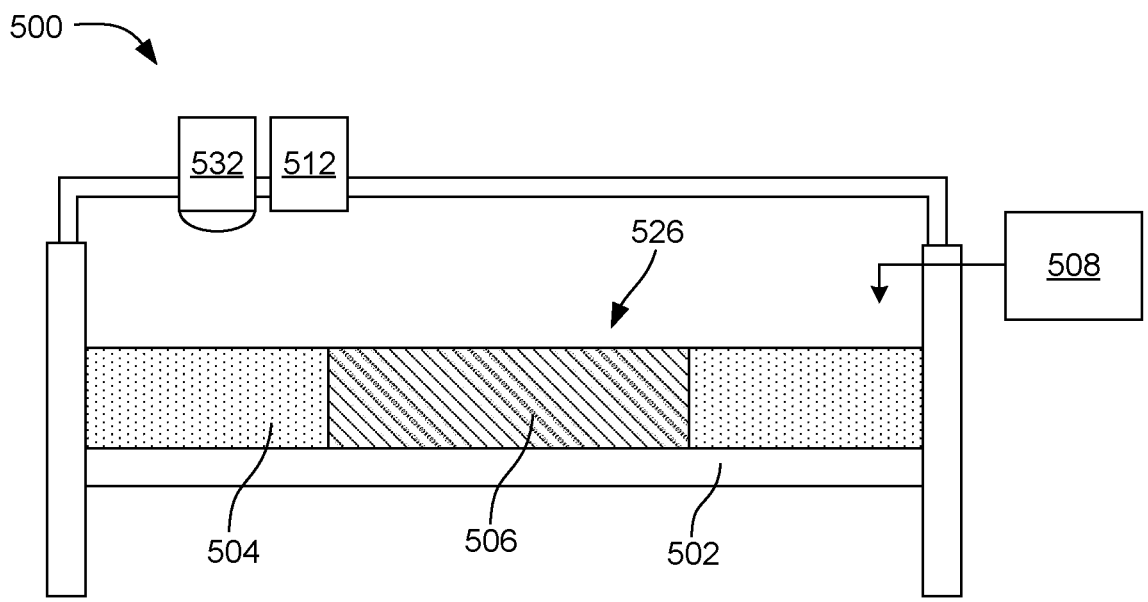
FIG. 7 is another schematic view of the example 3D printing system in accordance with the present disclosure.

FIGS. 5-7 illustrate one example method of making a 3D printed article. For example, FIG. 5 shows a 3D printing system 500 that includes a build platform 502 supporting a powder bed of polymeric powder 504. A partially printed article 506 is made up of fused polymeric powder in the powder bed. This figure shows a cross-sectional view of the partially printed article and the powder bed. A layer of fresh polymeric powder is supplied from a build material supply 508 over the top of the partially printed article. Agent is applied to the layer of fresh polymeric powder, including fusible agent 510 from a fusible agent jet 512. The fusible agent jet is moveable within the printing system so that the fusible agent jet can move across the powder bed to apply the agent in specific, desired locations. The system also includes an electromagnetic energy source 532.

FIG. 6 shows the 3D printing system 500 after the fusing agent has been jetted onto portions of the fresh polymeric powder 504. The top layer of build material now includes areas 514 jetted with fusing agent. Generally, the fusing agent can be jetted in all areas where the composite fiber powder is to be fused to form a solid material. The powder bed can be exposed to electromagnetic energy 530 from an energy source 532, such as an infrared lamp.

FIG. 7 shows the 3D printing system 500 after fusing the top layer to form a surface layer and complete a 3D printed article 506. The surface layer includes a fused area forming part of the complete 3D printed article and an area of unfused polymeric powder 504.

As mentioned above, individual layers of the 3D printed article can be formed by fusing the polymeric powder bed material. A fusing agent can be applied to the polymeric powder in areas to be fused. 3D printing systems used to perform these printing methods can include an electromagnetic energy source to apply electromagnetic energy to fuse the polymeric powder printed with the fusible agent. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the portions printed with the fusing agent while leaving the unprinted portions of the polymeric powder below the fusing temperature.

In one example, the fusing lamp can be matched with the energy absorber in the fusing agent so that the source emits wavelengths of light that match the peak absorption wavelengths of the energy absorber. An energy absorber with a narrow peak at a particular near-infrared wavelength can be used with an electromagnetic radiation fusing source that emits a narrow range of wavelengths at approximately the peak wavelength of the fusing agent. Similarly, an energy absorber that absorbs a broad range of near-infrared wavelengths can be used with an electromagnetic radiation fusing source that emits a broad range of wavelengths. Matching the energy absorber and the electromagnetic radiation fusing source in this way can increase the efficiency of fusing the polymeric powder particles with the fusing agent printed thereon, while the unprinted polymeric powder particles do not absorb as much light and remain at a lower temperature.

In some examples, the three-dimensional printing system can also include preheaters for preheating the polymeric powder bed material to a temperature near the fusing temperature. In one example, the system can include a print bed heater to heat the print bed during printing. The preheat temperature used can depend on the specific polymeric powder used. In some examples, the print bed heater can heat the print bed to a temperature from about 50° C. to about 250° C. In some examples, the print bed heater can be employed to anneal the 3D printed article after formation. The system can also include a supply bed, where polymeric powder particles can be stored before being spread in a layer onto the print bed. The supply bed can have a supply bed heater. In some examples, the supply bed heater can heat the supply bed to a temperature from about 80° C. to about 140° C.

Depending on the amount of energy absorber present in the polymeric powder, the absorbance of the energy absorber, the preheat temperature, and the fusing temperature of the specific polymeric powder, an appropriate amount of irradiation can be supplied from the electromagnetic energy source or fusing lamp. In some examples, the fusing lamp can irradiate each layer from about 0.1 seconds to about 10 seconds per pass. In further examples, the fusing lamp can move across the powder bed at a rate of about 1 inch per second to about 60 inches per second to fuse each layer. In still further examples, the fusing lamp can move across the powder bed at a rate of about 5 inches per second to about 20 inches per second.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if individual numerical values and sub-ranges are explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are only exemplary or illustrative of the application of the principles of the presented materials kits and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be acceptable examples.

Example 1—Preparation of Polymeric Powder Samples

Various blends of polymeric powders were prepared for use in forming 3D printed articles. Table 1 presents the raw materials that were used to prepare the various polymeric powder blends.

TABLE 1

Raw Materials used in Polymeric Powder Blends

| Raw Material | Base Polymer | % Glass Fiber (wt %) | Aspect Ratio | D50 Particle Size (μm) |
|---|---|---|---|---|
| A | PA12 | 0 | 1* | 20 |
| B | PA12 | 0 | 1* | 10 |
| C | PA12 | 0 | 1* | 60 |
| D | PA12 | 20 | Low | 80 |
| E | PA12 | 30 | Low | 85 |
| F | PA12 | 20 | High | 66 |

*Aspect ratio of 1 indicates that the powder particle is largely spherical instead of elongate or rod-shaped.

The specific blends of raw materials used to prepare the polymeric powders are presented in Table 2. The quality of the resulting 3D printed parts are also presented in Table 2.

TABLE 2

Polymer Powder Blends

| Sample | F | C | A | B | D | E | Quality of Printed Parts |
|---|---|---|---|---|---|---|---|
| 1 | 0.5 | 0 | 0 | 0 | 0.5 | 0 | Did not print (same ratio as sample 6) |
| 2 | 0.75 | 0.125 | 0.0625 | 0.0625 | 0 | 0 | Did not print (same ratio as sample 5) |
| 3 | 0.9 | 0 | 0.05 | 0.05 | 0 | 0 | Some surface defects; acceptable density |
| 4 | 0 | 0.125 | 0.0625 | 0.0625 | 0.75 | 0 | Good density |
| 5 | 0.75 | 0.125 | 0.0625 | 0.0625 | 0 | 0 | Good density |
| 6 | 0.5 | 0 | 0 | 0 | 0.5 | 0 | Good density |
| 7 | 0.5 | 0 | 0 | 0 | 0 | 0.5 | Good density |
| 8 | 0.75 | 0.25 | 0 | 0 | 0 | 0 | Good density |
| 9 | 0.8 | 0.2 | 0 | 0 | 0 | 0 | Poor quality |
| 10 | 0.875 | 0 | 0.125 | 0 | 0 | 0 | Poor quality |
| 11 | 0.9 | 0.05 | 0.025 | 0.025 | 0 | 0 | Poor quality |
| 12 | 0.8 | 0 | 0.1 | 0.1 | 0 | 0 | Poor quality |
| 13 | 1 | 0 | 0 | 0 | 0 | 0 | Low density |

Samples 1 and 6 were prepared at equivalent ratios, but Sample 1 was not printed whereas Sample 6 was 3D printed. Similarly, Samples 2 and 5 were prepared at equivalent ratios, but Sample 2 was not printed whereas sample 5 was 3D printed.

As can be seen from Table 2, Samples 9-13 produced poor quality 3D printed articles. In contrast, Samples 4-8 produced good quality 3D printed articles. Sample 3 had some surface defects, but still had good density.

Table 3 shows the particle size distribution and bulk density of the polymeric powder blends presented in Table 2. The volumetric particle size distribution for the polymeric powder blends was evaluated via laser diffraction using a Malvern™ Mastersizer™ 3000. The bulk density was measured by filling a 100 ml container with individual blends and measuring the respective masses of the blends.

TABLE 3

Particle Size Distribution and Bulk Density of Polymeric Powder Blends

| Sample | D10 (by volume) | D50 (by volume) | D90 (by volume) | Bulk density (g/cc) |
|---|---|---|---|---|
| 1 | 35.7 | 83.2 | 243 | 0.238 |
| 2 | 25.8 | 72.6 | 272 | 0.204 |
| 3 | 27.5 | 75.4 | 239 | 0.189 |
| 4 | 32.9 | 72.3 | 179 | 0.358 |
| 5 | 26.1 | 69.1 | 235 | 0.219 |
| 6 | 35.8 | 82.9 | 236 | 0.238 |
| 7 | 35.7 | 86.2 | 236 | 0.238 |
| 8 | 31.7 | 72 | 222 | 0.185 |
| 9 | 28.7 | 74.6 | 251 | 0.2 |
| 10 | 27.8 | 76 | 246 | 0.183 |
| 11 | 29.5 | 75.4 | 232 | 0.193 |
| 12 | 22 | 66.3 | 226 | 0.203 |
| 13 | 32.6 | 85.7 | 250 | 0.18 |

Example 2—Mechanical Properties of the Polymeric Powder Blends

Figure 8A:
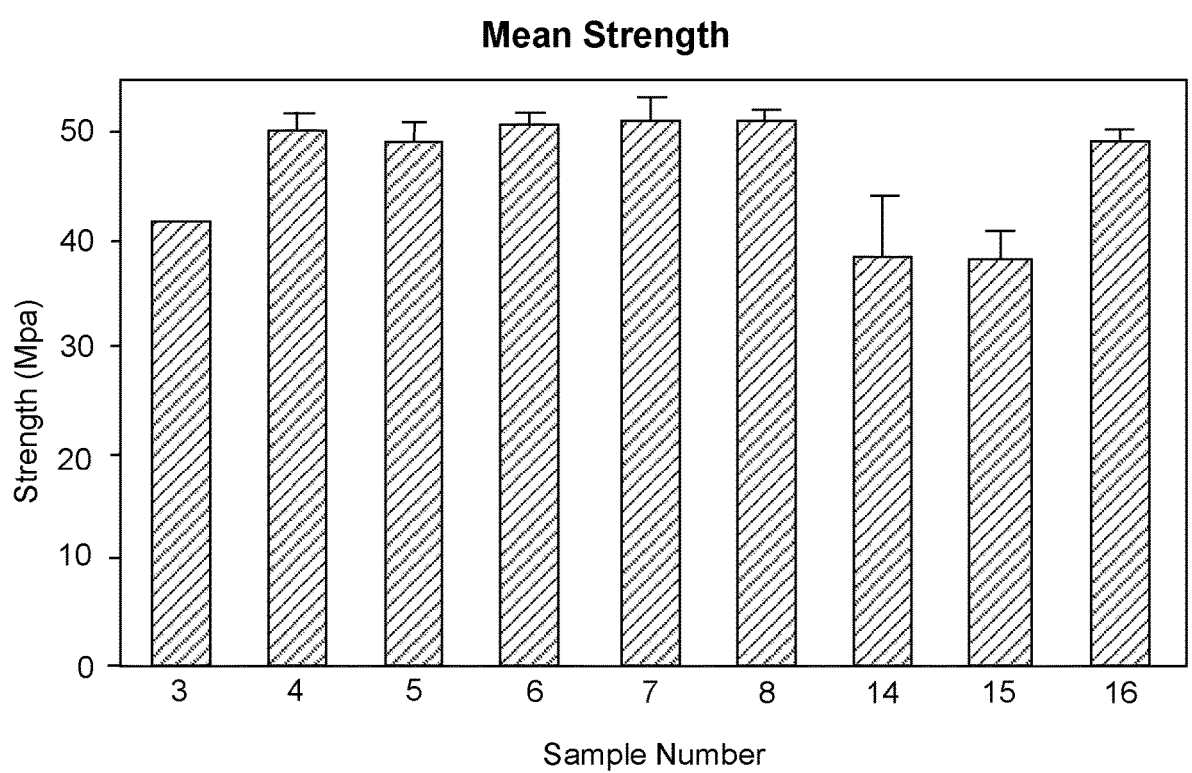
FIG. 8A is a graph of tensile strength in accordance with the present disclosure.
Figure 8B:
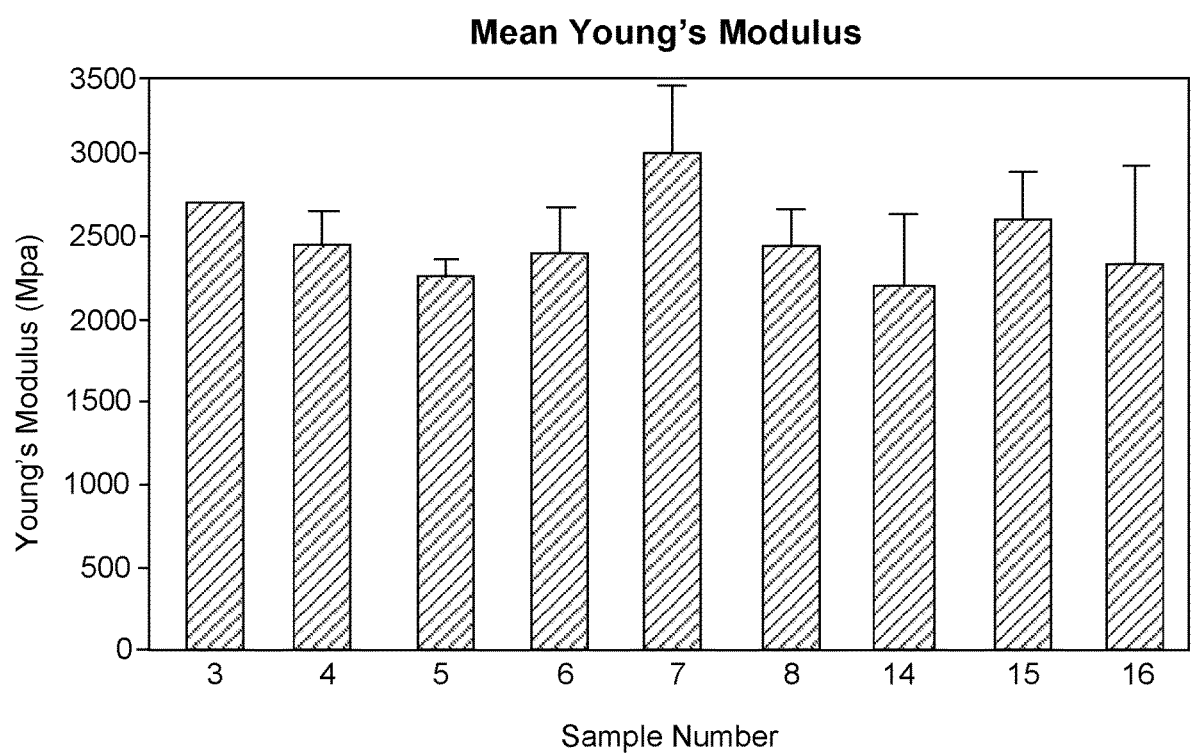
FIG. 8B is a graph of Young's modulus in accordance with the present disclosure.
Figure 8C:
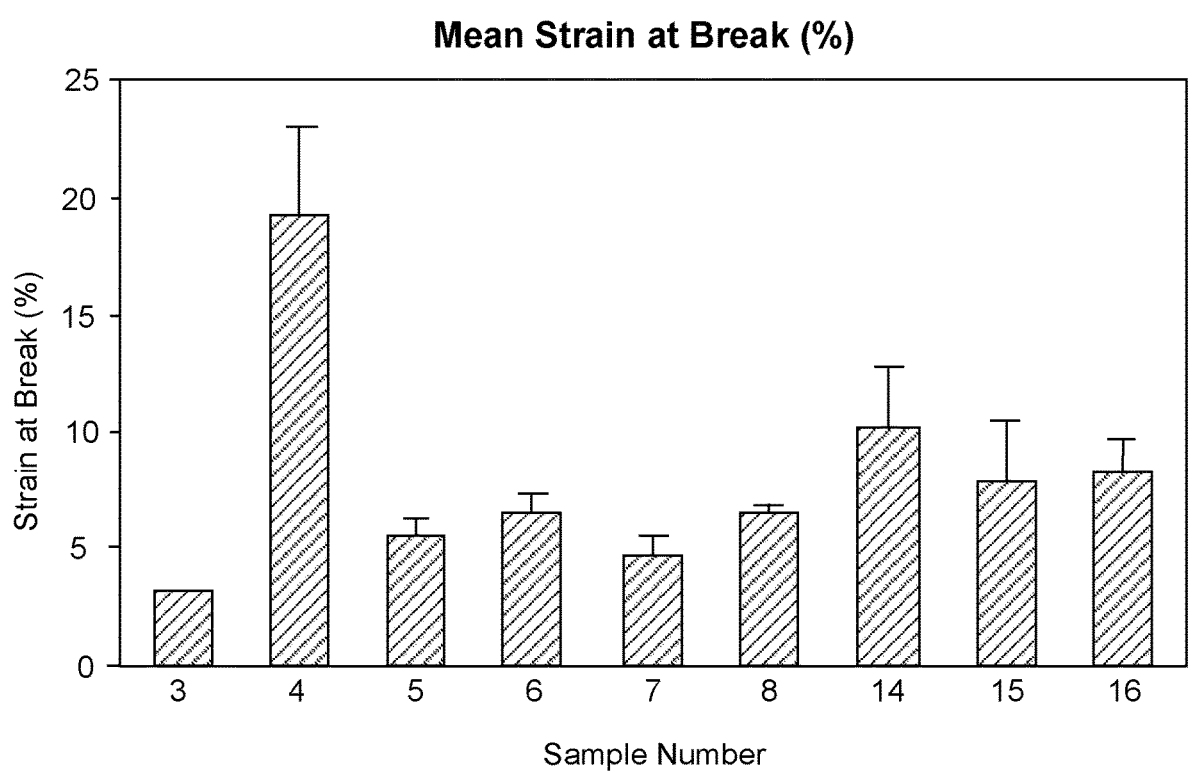
FIG. 8C is a graph of strain at break (%) in accordance with the present disclosure.

Some of the polymeric powder blends described in Example 1 were printed and tested to evaluate the mechanical properties of the 3D printed articles. Specifically, ultimate tensile strength, Young's modulus, and strain at break (%) were evaluated using Type V specimens defined in ASTM D638. Also, due to a limited amount of powder material, data for the 3D printed articles was only collected in the XY direction. FIG. 8A depicts the ultimate tensile strength of the 3D printed articles. FIG. 8B depicts the Young's modulus of the 3D printed articles. FIG. 8C depicts the strain at break (%) of the 3D printed articles.

As can be seen from the results depicted in FIGS. 8A-8C, the 3D printed articles of Samples 4-8 had the highest strength and the highest modulus.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. A three-dimensional printing formulation comprising: polymeric powder, comprising:
   high aspect ratio composite particles including glass fibers coated with an encapsulating polymer in an amount from about 5 wt % to about 80 wt % based on a total weight of the polymeric powder, the high aspect ratio composite particles having an aspect ratio from about 7:1 to about 30:1; and
   low aspect ratio filler particles in an amount from about 20 wt % to about 95 wt % based on a total weight of the polymeric powder, the low aspect ratio filler particles having an aspect ratio from 1:1 to less than 7:1.

2. The three-dimensional printing formulation of claim 1, wherein the high aspect ratio composite particles include from about 10 wt % to about 30 wt % glass fibers coated with from about 70 wt % to about 90 wt % encapsulating polymer, based on a total weight of the high aspect ratio composite particles.

3. The three-dimensional printing formulation of claim 1, wherein the low aspect ratio filler particles have a D50 particle size distribution, by volume, from about 5 μm to about 100 μm.

4. The three-dimensional printing formulation of claim 1, wherein the low aspect ratio filler particles are polymer particles, core-shell polymer particles, polymer-coated particles, polymer-coated fibers, or a combination thereof.

5. The three-dimensional printing formulation of claim 1, wherein the low aspect ratio filler particles are polyamide-11 polymer particles, polyamide-12 polymer particles, glass fibers, glass fibers coated with polyamide-11 polymer, glass fibers coated with polyamide-12 polymer, inorganic filler particles, glass beads coated with polyamide-11 polymer, glass beads coated with polyamide-12 polymer, or a combination thereof.

6. The three-dimensional printing formulation of claim 1, wherein the low aspect ratio filler particles are glass fibers coated with polyamide-11 polymer or polyamide-12 polymer, the low aspect ratio filler particles having an average aspect ratio from about 1.3:1 to about 6:1 and a D50 particle size distribution, by volume, from about 70 μm to about 100 μm.

7. The three-dimensional printing formulation of claim 1, wherein the low aspect ratio filler particles comprise polyamide-11 polymer particles, polyamide-12 polymer particles, or glass beads coated with polyamide-11 polymer or polyamide-12 polymer, the low aspect ratio filler particles having an average aspect ratio of 1:1 to about 1.3:1 and a D50 particle size distribution, by volume, from about 5 μm to about 70 μm.

8. The three-dimensional printing formulation of claim 1, wherein the polymeric powder has a bulk density from about 0.18 g/cc to about 0.6 g/cc.

9. A materials kit for three-dimensional printing comprising:
a polymeric powder including high aspect ratio composite particles and low aspect ratio filler particles, the high aspect ratio composite particles including glass fibers coated with an encapsulating polymer in an amount from about 5 wt % to about 80 wt % based on a total weight of the polymeric powder and having an aspect ratio from about 7:1 to about 30:1, the low aspect ratio filler particles in an amount from about 20 wt % to about 95 wt % based on a total weight of the polymeric powder and having an aspect ratio from 1:1 to less than 7:1; and
a fusing agent comprising an energy absorber to absorb electromagnetic radiation to produce heat.

10. The materials kit of claim 9, wherein the encapsulating polymer includes polyamide-12, polyamide-11, polyamide-6-13, polyamide-6, polypropylene, thermoplastic polyamide, thermoplastic polyurethane, or a combination thereof.

11. The materials kit of claim 9, wherein the energy absorber comprises a carbon black pigment, a near-infrared absorbing dye, a near-infrared absorbing pigment, a tungsten bronze, a molybdenum bronze, metal nanoparticles, or a conjugated polymer, or a combination thereof.

12. A method of making a 3D printed article, comprising:
iteratively applying individual build material layers of a polymeric powder, the polymeric powder including high aspect ratio composite particles and low aspect ratio filler particles, the high aspect ratio composite particles including glass fibers coated with an encapsulating polymer in an amount from about 5 wt % to about 80 wt % based on a total weight of the polymeric powder and having an aspect ratio from about 7:1 to about 30:1, the low aspect ratio filler particles in an amount from about 20 wt % to about 95 wt % based on a total weight of the polymeric powder and having an aspect ratio from 1:1 to less than 7:1; and
based on a 3D object model, selectively jetting a fusible fluid onto individual build material layers, where the fusible fluid comprises an energy absorber; and
exposing the polymeric powder to electromagnetic energy to selectively fuse the high aspect ratio composite particles and low aspect ratio filler particles in contact with the energy absorber at individual build material layers to form a 3D printed article.

13. The method of claim 12, further comprising maintaining the 3D printed article at a temperature from about 140° C. to about 180° C. for a period from about 30 minutes to about 72 hours after formation of the 3D printed article.

14. The method of claim 12, further comprising allowing the 3D printed article to cool immediately following formation of the 3D printed article.

15. The method of claim 12, wherein the printed article has a tensile strength in the X-Y axis from about 25 MPa to about 65 MPa, a Young's modulus in the X-Y axis from about 1600 MPa to about 4500 MPa, and a strain at break in the X-Y axis from about 4% to about 50%.

* * * * *